Patented June 27, 1933

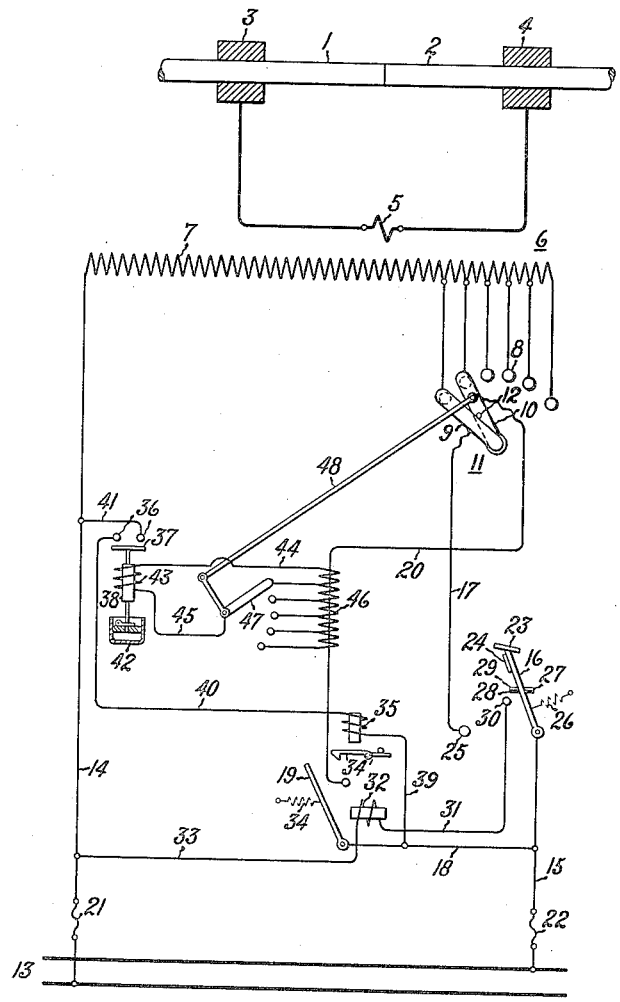

1,916,013

UNITED STATES PATENT OFFICE

JOHANN OTTO, OF HENNIGSDORF, AND EBERHARD RIETSCH, OF TEGEL, GERMANY, ASSIGNORS TO GENERAL ELECTRIC COMPANY, A CORPORATION OF NEW YORK

RESISTANCE WELDING

Original application filed January 30, 1928, Serial No. 250,669, and in Germany February 18, 1927. Divided and this application filed April 2, 1932. Serial No. 602,798.

Our invention relates to improvements in resistance welding and has as an object the provision of a method by means of which the total welding period may be shortened.

In particular, our invention relates to that form of resistance welding known as flash welding.

A flash weld is in reality a butt weld that is made quickly starting with light contact pressure followed by a period of sparking with no pressure and finished with heavy pressure when a portion of the metal at the joint is thrown out in the form of a burr.

It has been found desirable, particularly with parts of large cross-section, to heat the work parts initially prior to the welding process proper. This is accomplished by bringing the parts into engagement and passing a current through them as in the old process of butt welding until preferably a bright red heat is reached. Following this the parts are separated and the flash welding process instituted.

The voltage that may be applied to the work parts during the welding period is limited by the fact that if a certain voltage is exceeded pieces of metal are blown out from the joint leaving it with cracks and holes which render the welded structure unsuitable for the purpose of its manufacture. It is thus apparent that the amount of voltage that can be applied to the work parts during the welding period is limited. According to our invention the total period of welding is shortened by shortening the preheating period which of itself requires a longer time than the welding period proper. This we accomplish by applying during the preheating period a greater secondary voltage to the work parts than is used subsequently during the welding period.

The single figure of the drawing diagrammatically illustrates apparatus suitable for carrying into effect our improved process of welding. This apparatus forms the subject matter of our application, Serial No. 250,669 for resistance welding filed January 30, 1928, and assigned to the same assignee as the present application.

Referring to the drawing, the work parts 1 and 2 are held in suitable clamping members 3 and 4. The welding current in accordance with my invention is supplied from an inductive apparatus adapted to vary the welding voltage. As illustrated the members 3 and 4 constitute the terminals of the secondary 5 of a transformer 6. The primary 7 of this transformer 6 is provided with a plurality of terminals or taps 8 with which the contact fingers 9 and 10 of a switch 11 are adapted to make contact. As illustrated the contact fingers 9 and 10 are mechanically connected but electrically insulated from one another and means are provided, such as the pin 12 on finger 10, so that one finger must make contact with a tap at least one step higher than the tap with which the other finger makes contact. The contact fingers 9 and 10 may however be separated from one another various distances and will be adjusted by the welder relative to one another for different classes of work. It is, of course, apparent that other forms of switching means may be used instead of that illustrated so long as means are provided for predetermining two circuits through different taps of the winding of the transformer.

The untapped terminal of the primary 7 of transformer 6 is connected to one side of a source of supply 13 by a conductor 14. The tapped terminal of the transformer primary is connected to the other side of the source of supply 13 either by means of conductor 15, switch 16, conductor 17 and contact finger 9, or by conductors 15 and 18, circuit breaker 19, conductor 20 and contact finger 10. Protective devices indicated as fuses are provided at 21 and 22 in the conductors 14 and 15 between the welding machine and the source of supply.

The switch 16 is illustrated in the drawing as a foot switch provided with a tread 23 and a contact 24 adapted to engage a terminal 25 when the switch is depressed from its open position against the action of a spring 26 which acts to normally maintain the switch 16 in an open position. The switch is also provided with an additional contact member 27 which comprises an insulating strip 28 and a conductive strip 29. When the switch is depressed from its open position the insulating portion 28 of the contact 27 slides over the terminal 30 interposed in its path without completing a circuit through the switch 16 and this terminal 30. However, when the switch is allowed to return to its open position the conductive portion 29 of the contact 27 makes engagement with the terminal 30 completing a circuit through this terminal. The circuit completed through terminal 30 is as follows: One side of the source of supply through conductor 15, switch 16, contact 27, terminal 30, conductor 31, closing coil 32 of circuit breaker 19 and conductors 33 and 14 to the other side of the source of supply.

Circuit breaker 19 is normally biased to an open position by means of a spring 34 but upon being closed is held in the closed position by a latch 34'. The latch 34' is controlled by a coil 35 whose circuit is completed at contacts 36 by a contact member 37 of relay 38, the circuit being as follows:—from one side of the source of supply through conductors 15, 18 and 39, coil 35, conductor 40, contacts 36 and contact member 37 and conductors 41 and 14, to the other side of the source of supply.

Relay 38 is an overload time relay having a dashpot 42 and a coil 43 which is connected through conductors 44 and 45 to a current transformer 46 in the conductor 20. The secondary of the current transformer 46 is tapped and its connection with the operating coil 43 of the relay 38 is determined by a switch 47 which is mechanically connected by a member 48 to the switch 11 in such a manner that the relay is energized to substantially the same extent at all of the welding voltages predetermined by the switching means 11.

The method of operation is as follows: Work parts 1 and 2 are inserted in clamps 3 and 4 and brought into engagement with one another as shown in the drawing. The transformer 6 is then connected to the source of supply by depressing the foot switch 16 until the contact 24 engages the terminal 25 which then completes a circuit as follows: from one side of the source of supply through conductor 15, switch 16, contact 24, terminal 25, conductor 17, contact finger 9 of switch 11, primary winding 7 of transformer 6 and conductor 14, to the other side of the source of supply. This connection will cause a heating current to flow through the work parts and when the preheating operation has progressed sufficiently the operator releases the switch 16 which is then returned to the illustrated position by means of the spring 26. Upon its return, however, a circuit previously traced is completed through coil 32 by contact member 27 which causes the circuit breaker 19 to close thus completing a second circuit as follows: from one side of the source of supply through conductors 15 and 18, circuit breaker 19, conductor 20 and contact finger 10 of switch 11, through the primary of the transformer 6, and conductor 14 to the other side of the source of supply. This second circuit will impress upon the work parts a secondary voltage that is less than that of the secondary voltage impressed upon the work parts by reason of the first circuit traced since the number of primary turns has been increased. With the connection just traced the operator performs the flash welding operation following which he brings the work parts together in what is called an upsetting operation. When the parts 1 and 2 are brought firmly together an excessive current flows in the welding circuit and relay 38 connected to the welding circuit through transformer 46 by connections previously traced operates to complete a circuit through the tripping coil 35, also previously traced, to release the circuit breaker 19 which will open and thus interrupt the welding operation after a predetermined interval determined by the adjustment of the time delay means shown as dashpot 42.

While we have described a particular embodiment of our invention and certain apparatus for carrying out our method of welding it will be obvious to those skilled in the art that various modifications may be made without departing from our invention and we therefore desire in the appended claims to cover all such modifications as fall within the true spirit and scope of our invention.

What we claim as new and desire to secure by Letters Patent of the United States, is:—

1. The process of electric flash welding which comprises applying to the work parts a voltage sufficient to produce a relatively large current to preheat the abutting ends of said parts to a temperature below their fusing points and thereafter producing a sparking engagement between said parts while applying thereto a lower voltage insufficient to produce, while the end portions of said parts are molten, a current great enough to blow molten metal from the joint.

2. In the process of welding wherein the parts are first preheated and thereafter welded the steps of preheating the abutting end portions of the parts to be welded to a bright red heat by passing a current through them in excess of that which would blow molten metal from the joint and reducing the flow of current while producing a sparking engagement between said parts during the welding operation to a value insufficient to blow molten metal from the joint.

3. The method of shortening a welding operation in which the abutting end parts are brought to a welding heat prior to the application of welding pressure by a sparking engagement which comprises applying during said sparking engagement a voltage insufficient to blow pieces of metal from the joint and preheating the parts prior to welding by placing them in abutting engagement with one another and applying thereto a voltage greater than that used in the welding operation.

4. The method of shortening the total period of resistance flash welding which comprises placing the parts in abutting engagement, preheating them to a temperature below their fusing point by applying thereto a voltage greatly in excess of that which would blow molten metal from the joint, producing a sparking engagement between said parts by applying thereto a voltage that will not blow pieces of metal from the joint during said sparking engagement, forcing said parts into welding engagement with one another after their abutting end portions have been raised to a welding temperature and interrupting the flow of current through said parts a predetermined time after they have been brought into welding engagement with one another.

In witness whereof, we have hereunto set our hands.

JOHANN OTTO.
EBERHARD RIETSCH.